US012804522B2

(12) United States Patent
Akl et al.

(10) Patent No.: US 12,804,522 B2
(45) Date of Patent: Nov. 17, 2026

(54) ENHANCED ADMISSION CONTROL IN INTEGRATED ACCESS AND BACKHAUL (IAB)

(71) Applicant: QUALCOMM Incorporated, San Diego, CA (US)

(72) Inventors: Naeem Akl, Somerville, NJ (US); Karl Georg Hampel, Jersey City, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 622 days.

(21) Appl. No.: 17/554,939

(22) Filed: Dec. 17, 2021

(65) Prior Publication Data

US 2022/0225219 A1 Jul. 14, 2022

Related U.S. Application Data

(60) Provisional application No. 63/135,234, filed on Jan. 8, 2021.

(51) Int. Cl.
*H04W 48/16* (2009.01)
*H04L 47/72* (2022.01)
*H04W 28/02* (2009.01)

(52) U.S. Cl.
CPC ............ *H04W 48/16* (2013.01); *H04L 47/72* (2013.01); *H04W 28/0268* (2013.01)

(58) Field of Classification Search
CPC ............ H04W 48/16; H04W 28/0268; H04W 36/0044; H04W 36/005; H04W 84/047; H04W 88/085; H04L 47/72
See application file for complete search history.

(56) References Cited

U.S. PATENT DOCUMENTS

2021/0051547 A1* 2/2021 Koskinen .............. H04W 36/38
2022/0104088 A1* 3/2022 Byun ............... H04W 36/0235
(Continued)

FOREIGN PATENT DOCUMENTS

WO WO-2019246446 A1 * 12/2019 .......... H04W 36/087

OTHER PUBLICATIONS

3GPP, Technical Specification 5G; NG-RAN; F1 Application Protocol (F1AP), ETSI, 2018, TS 138.473 v 15.3.0 Release 15 (Year: 2018).*

*Primary Examiner* — Noel R Beharry
*Assistant Examiner* — Angelie T Ngo
(74) *Attorney, Agent, or Firm* — Patterson & Sheridan LLP

(57) ABSTRACT

Techniques for admission control in an Integrated Access and Backhaul (IAB) network. An example includes sending, by a first base station (BS) to an IAB-node, a request message requesting to setup or modify a context for a child node of a first logical IAB-distributed unit (DU) of the IAB-node. The first logical IAB-DU is associated with the first BS. An indication is sent to the LAB-node that the child node is currently served by the IAB-node at a second logical IAB-DU of the IAB-node. The second logical IAB-DU is associated with a second BS. An acknowledgment message is received from the IAB-node based at least in part on the indication to the IAB-node.

28 Claims, 11 Drawing Sheets

(56) References Cited

U.S. PATENT DOCUMENTS

| | | | | |
|---|---|---|---|---|
| 2022/0104110 | A1* | 3/2022 | Khanfouci | H04W 40/22 |
| 2022/0361067 | A1* | 11/2022 | Koskinen | H04B 7/15528 |
| 2023/0164524 | A1* | 5/2023 | Luo | H04W 4/08<br>370/329 |
| 2023/0199575 | A1* | 6/2023 | Liu | H04W 36/30<br>370/331 |
| 2023/0239757 | A1* | 7/2023 | Huang | H04W 36/0005<br>370/331 |
| 2023/0247495 | A1* | 8/2023 | Teyeb | H04W 36/0072<br>370/331 |
| 2023/0362745 | A1* | 11/2023 | Huang | H04W 40/22 |
| 2023/0371110 | A1* | 11/2023 | Zhu | H04W 36/0009 |
| 2023/0403617 | A1* | 12/2023 | Wu | H04W 36/362 |

* cited by examiner

ENHANCED ADMISSION CONTROL IN INTEGRATED ACCESS AND BACKHAUL (IAB)

CROSS-REFERENCE TO RELATED APPLICATION(S)

This application claims benefit of and priority to U.S. Provisional Application No. 63/135,234, filed Jan. 8, 2021 which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for admission control in an Integrated Access and Backhaul (IAB) network or other type of network.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink (DL) channels (e.g., for transmissions from a BS or DU to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the DL and on the UL. To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved communications between wireless communication devices. Aspects of the present disclosure provide techniques for admission control in a network (e.g., an Integrated Access and Backhaul (IAB) network).

Certain aspects of the subject matter described in this disclosure can be implemented in a method for wireless communication by a first base station (BS). The method generally includes sending, to an IAB-node, a request message requesting to setup or modify a context for a child node of a first logical IAB-DU of the IAB-node, wherein the first logical IAB-DU is associated with the first BS, sending an indication to the IAB-node that the child node is currently served by the IAB-node at a second logical IAB-DU of the IAB-node, wherein the second logical IAB-DU is associated with a second BS, and receiving an acknowledgment message from the IAB-node based at least in part on the indication to the IAB-node.

Certain aspects of the subject matter described in this disclosure can be implemented in a method for wireless communication by an IAB node. The method generally includes receiving, from a first BS, a request message to setup or modify a context for a child node of a first logical IAB-DU of the IAB-node, wherein the first logical IAB-DU is associated with the first BS, receiving, from the first BS, an indication that the child node is currently served by the IAB-node at a second logical IAB-DU of the IAB-node, wherein the second logical IAB-DU is associated with a second BS, performing admission control based at least in part on the indication, and sending an acknowledgment message to the first BS based on the admission control.

Certain aspects of the subject matter described in this disclosure can be implemented in an apparatus for wireless communication by a first BS. The apparatus generally includes: a memory; and one or more processors coupled to the memory, the memory and the one or more processors being configured to: send, to an IAB-node, a request message requesting to setup or modify a context for a child node of a first logical IAB-DU of the IAB-node, wherein the first logical IAB-DU is associated with the first BS, send an indication to the IAB-node that the child node is currently served by the IAB-node at a second logical IAB-DU of the IAB-node, wherein the second logical IAB-DU is associated with a second BS, and receive an acknowledgment message from the IAB-node based at least in part on the indication to the IAB-node.

Certain aspects of the subject matter described in this disclosure can be implemented in an apparatus for wireless communication by an IAB node. The apparatus generally includes: a memory; and one or more processors coupled to the memory, the memory and the one or more processors being configured to: receive, from a first BS, a request message to setup or modify a context for a child node of a first logical IAB-DU of the IAB-node, wherein the first logical IAB-DU is associated with the first BS, receive, from the first BS, an indication that the child node is currently served by the IAB-node at a second logical IAB-DU of the IAB-node, wherein the second logical IAB-DU is associated with a second BS, perform admission control based at least in part on the indication, and send an acknowledgment message to the first BS based on the admission control.

Certain aspects of the subject matter described in this disclosure can be implemented in an apparatus for wireless communication by a first BS. The apparatus generally includes: means for sending, to an IAB-node, a request message requesting to setup or modify a context for a child node of a first logical IAB-DU of the IAB-node, wherein the first logical IAB-DU is associated with the first BS, means for sending an indication to the IAB-node that the child node is currently served by the IAB-node at a second logical IAB-DU of the IAB-node, wherein the second logical IAB-DU is associated with a second BS, and means for receiving an acknowledgment message from the IAB-node based at least in part on the indication to the IAB-node.

Certain aspects of the subject matter described in this disclosure can be implemented in an apparatus for wireless communication by an IAB node. The apparatus generally includes: means for receiving, from a first BS, a request message to setup or modify a context for a child node of a first logical IAB-DU of the IAB-node, wherein the first logical IAB-DU is associated with the first BS, means for receiving, from the first BS, an indication that the child node is currently served by the IAB-node at a second logical IAB-DU of the IAB-node, wherein the second logical IAB-DU is associated with a second BS, means for performing admission control based at least in part on the indication, and means for sending an acknowledgment message to the first BS based on the admission control.

Certain aspects of the subject matter described in this disclosure can be implemented in a computer-readable medium having instructions stored thereon to cause a first BS to: send, to an IAB-node, a request message requesting to setup or modify a context for a child node of a first logical IAB-DU of the IAB-node, wherein the first logical IAB-DU is associated with the first BS, send an indication to the IAB-node that the child node is currently served by the IAB-node at a second logical IAB-DU of the IAB-node, wherein the second logical IAB-DU is associated with a second BS, and receive an acknowledgment message from the IAB-node based at least in part on the indication to the IAB-node.

Certain aspects of the subject matter described in this disclosure can be implemented in a computer-readable medium having instructions stored thereon to cause an IAB node to: receive, from a first BS, a request message to setup or modify a context for a child node of a first logical IAB-DU of the IAB-node, wherein the first logical IAB-DU is associated with the first BS, receive, from the first BS, an indication that the child node is currently served by the IAB-node at a second logical IAB-DU of the IAB-node, wherein the second logical IAB-DU is associated with a second BS, perform admission control based at least in part on the indication, and send an acknowledgment message to the first BS based on the admission control.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure, and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide techniques for admission control for an Integrated Access and Backhaul (IAB) network. For example, a child node (e.g., a user equipment (UE)) may be handed over from a source base station (BS) to a target BS. To do so, an IAB-node may have to determine whether to admit the child node. In some scenarios, the child node may be served by the same IAB-node prior to and after the handover occurs. In some aspects, a target BS may indicate to the IAB-node that the child node is being served by the IAB-node itself, in effect indicating that admission of the child node should not require any additional resources to be allocated for the child node. As a result, the IAB-node may admit the child node and provide an acknowledgement to the target BS accordingly.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Example Wireless Communication Network

Figure 1:
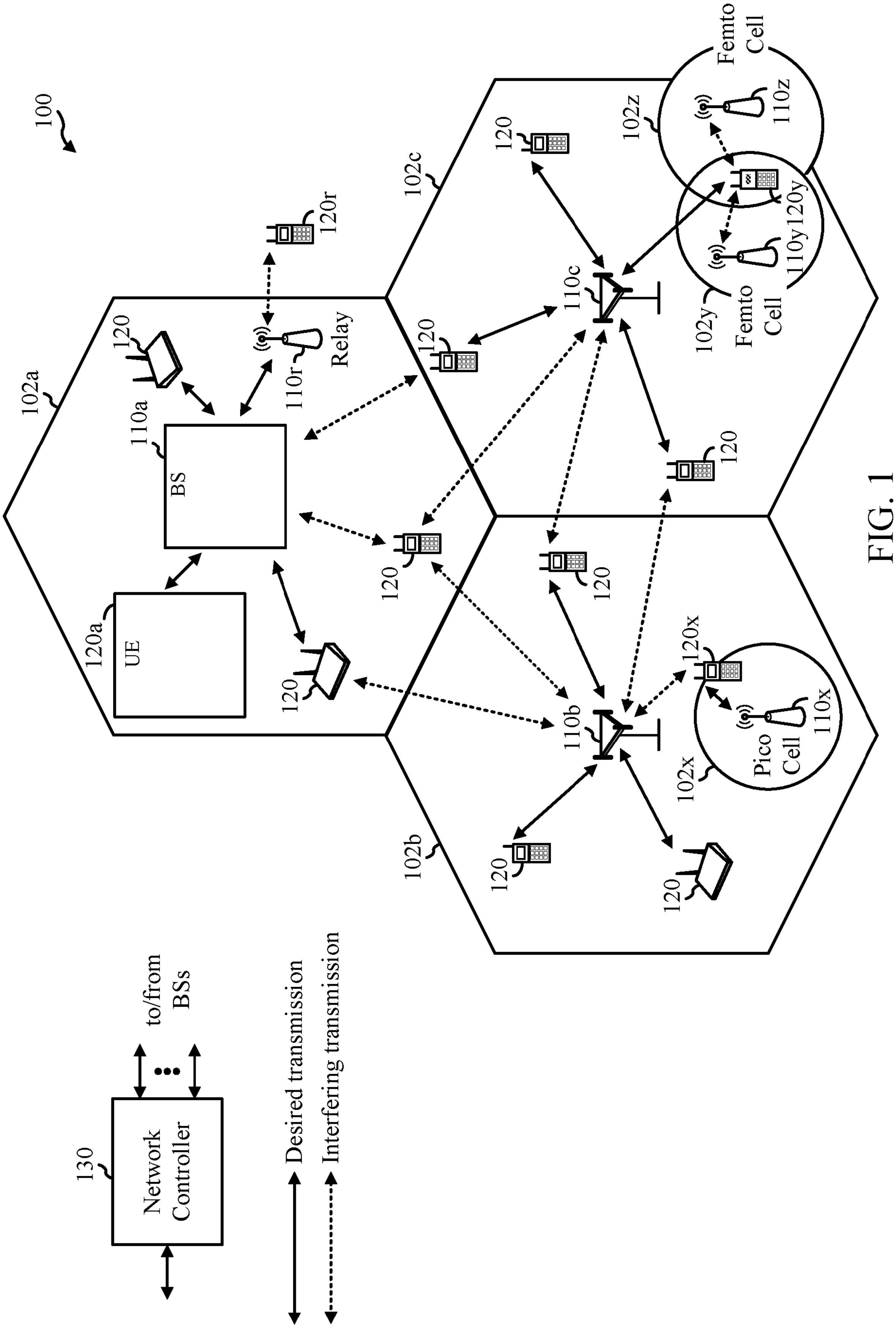
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, wireless communication network 100 may include a base station (BS) 110 configured to perform operations 700 of FIG. 7 and a network entity (e.g., an Integrated Access and Backhaul (IAB)-node) configured to perform operations 800 of FIG. 8.

As illustrated in FIG. 1, wireless communication network 100 may include a number of BSs 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, BSs 110*a*, 110*b* and 110*c* may be macro BSs for the macro cells 102*a*, 102*b* and 102*c*, respectively. BS 110*x* may be a pico BS for a pico cell 102*x*. BSs 110*y* and 110*z* may be femto BSs for the femto cells 102*y* and 102*z*, respectively. A BS 110 may support one or multiple cells. BSs 110 communicate with UEs 120*a-y* (each also individually referred to herein as UE 120 or collectively as UEs 120) in wireless communication network 100. The UEs 120 (e.g., 20*x*, 120*y*, etc.) may be dispersed throughout wireless communication network 100, and each UE 120 may be stationary or mobile.

Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. Network controller 130 may communicate with BSs 110 via a backhaul. BSs 110 may also communicate with one another (e.g., directly or indirectly) via wireless or wireline backhaul.

Figure 2:
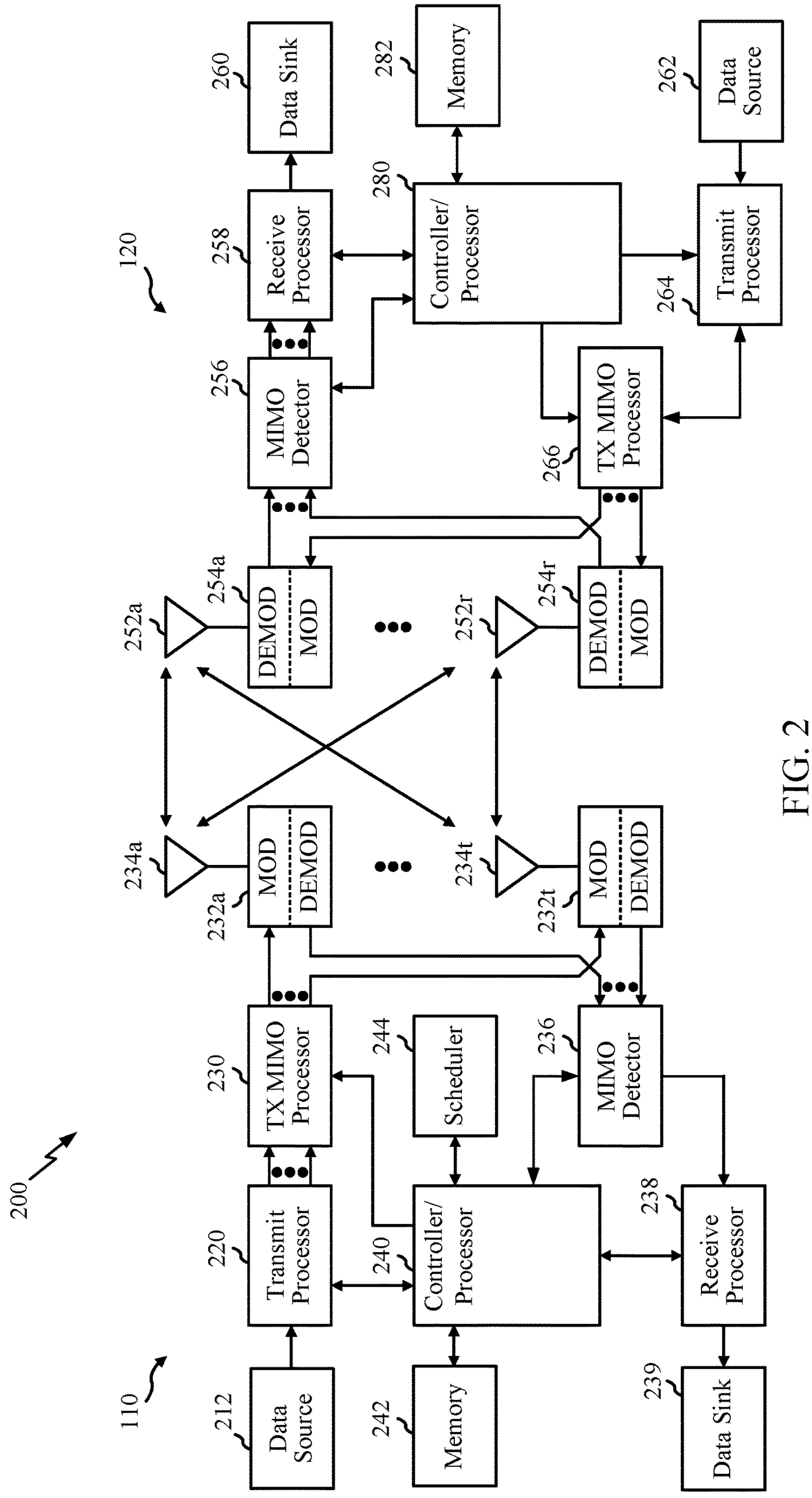
FIG. 2 is a block diagram conceptually illustrating a design of an example a base station (BS) and user equipment (UE), in accordance with certain aspects of the present disclosure.

FIG. 2 illustrates example components 200 of BS 110 and UE 120 (e.g., in wireless communication network 100 of FIG. 1), which may be used to implement aspects of the present disclosure. For example, antennas 252, processors 266, 258, 264, and/or controller/processor 280 of UE 120 and/or antennas 234, processors 220, 230, 238, and/or controller/processor 240 of the BS 110 may be used to perform the various techniques and methods described herein.

It should be noted that although FIG. 2 illustrates UE 120 communicating with a BS 110, an IAB-node may similarly communicate with a BS (e.g., donor-CU) and each may (e.g., respectively) have similar components as discussed with respect to FIG. 2. In other words, an IAB-node may have similar components as UE 120. The BS may be configured to perform operations 700 of FIG. 7, while an IAB-node (or other network entity) may have similar components as UE 120 and may be configured to perform operations 800 of FIG. 8.

At BS 110, a transmit processor 220 may receive data from a data source 212 and control information from a controller/processor 240. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), etc. The data may be for the physical downlink shared channel (PDSCH), etc. Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator/demodulator 232 may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a downlink (DL) signal. DL signals from modulators 232*a*-232*t* may be transmitted via the antennas 234*a*-234*t*, respectively.

At UE 120, antennas 252*a*-252*r* may receive DL signals from BS 110 or a parent IAB-node, or a child IAB-node may receive DL signals from a parent IAB-node, and may provide received signals to the demodulators (DEMODs) in transceivers 254*a*-254*r*, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for UE 120 to a data sink 260, and provide decoded control information to controller/processor 280. One or more of antennas 252, demodulators in transceivers 254, MIMO detector 256, receive processor 258, transmit processor 264, TX MIMO processor 266, and/or the like may be components within a transceiver of UE 120.

On the UL, at UE 120 or a child IAB-node, a transmit processor 264 may receive and process data (e.g., for the physical uplink shared channel (PUSCH) or the physical sidelink shared channel (PSSCH)) from a data source 262 and control information (e.g., for the physical uplink control channel (PUCCH) or the physical sidelink control channel (PSCCH)) from controller/processor 280. Transmit processor 264 may also generate reference symbols for a reference signal (RS) (e.g., for the sounding reference signal (SRS)). The symbols from transmit processor 264 may be precoded by a TX MIMO processor 266 if applicable, further processed by the demodulators in transceivers 254*a*-254*r* (e.g., for single carrier-frequency division multiplexing (SC-FDM), etc.), and transmitted to BS 110 or a parent IAB-node.

At BS 110 or a parent IAB-node, the UL signals from UE 120 may be received by antennas 234, processed by modulators 232, detected by MIMO detector 236 if applicable, and further processed by receive processor 238 to obtain decoded data and control information sent by UE 120. Receive processor 238 may provide the decoded data to a data sink 239 and the decoded control information to controller/processor 240. One or more of antennas 234, demodulators 232, TX MIMO processor 230, transmit processor 220, MIMO detector 236, receive processor 238, and/or the like may be components within a transceiver of BS 110.

Controllers/processors 240 and 280 may direct the operation at BS 110 and UE 120, respectively. Controller/processor 240 and/or other processors and modules at BS 110 may perform or direct the execution of processes for the techniques described herein. Controller/processor 280 and/or other processors and modules at UE 120 may perform or direct the execution of processes for the techniques described herein. Memories 242, 282 may store data and program codes for BS 110 and UE 120, respectively. A scheduler 244 may schedule UEs 120 for data transmission on the DL and/or UL.

Figure 3:
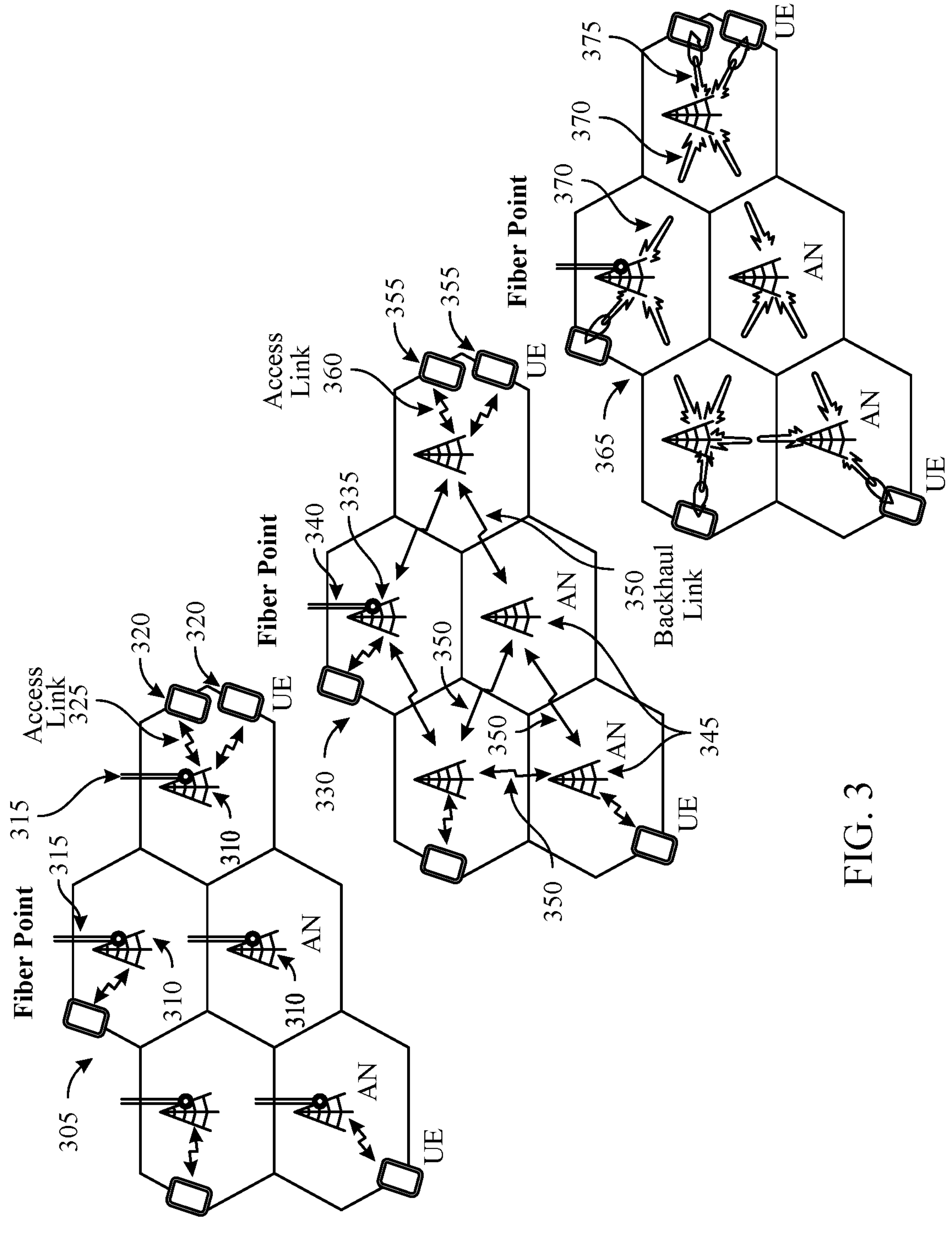
FIG. 3 is a diagram illustrating examples of radio access networks, in accordance with certain aspects of the present disclosure.

FIG. 3 is a diagram 300 illustrating examples of radio access networks (RANs), in accordance with certain aspects of the disclosure.

As shown by reference number 305, a traditional (for example, 3G, 4G, LTE) RAN may include multiple BS 310 (for example, access nodes (ANs)), where each BS 310 communicates with a core network via a wired backhaul link 315, such as a fiber connection. A BS 310 may communicate with a UE 320 via an access link 325, which may be a wireless link. In certain aspects, a BS 310 shown in FIG. 3 may correspond to a BS 110 shown in FIG. 1. Similarly, a UE 320 shown in FIG. 3 may correspond to a UE 120 shown in FIG. 1.

As shown by reference number 330, a RAN may include a wireless backhaul network. In some aspects or scenarios, a wireless backhaul network may sometimes be referred to as an IAB network. An IAB network may include multiple BS and the BSs may be of differing types or have differing operational characteristics. For example, in certain aspects, an JAB network may have at least one BS that is an anchor BS 335. Anchor BS 335 may communicates with a core network via a wired backhaul link 340, such as a fiber connection. Anchor BS 335 may also be referred to as an JAB donor. An IAB donor is an AN with wireline connection to a core network. An IAB node is an AN that relays traffic from/to anchor BS 335 through one or multiple hops. Anchor BSs 335 can be configured to communicate with other types of base stations or other communication devices (e.g. in a radio network or IAB network).

The IAB network may also include one or more non-anchor BSs 345. Non-anchor BSs 345 may be referred to as relay BSs or IAB nodes. Bon-anchor BS 345 may communicate directly with or indirectly with (for example, via one or more other non-anchor BSs 345) anchor BS 335 via one or more backhaul links 350 to form a backhaul path to the core network for carrying backhaul traffic. Backhaul link 350 may be a wireless link. Anchor BS(s) 335 or non-anchor BS(s) 345 may communicate with one or more UEs 355 via access links 360, which may be wireless links for carrying access traffic. In certain aspects, an anchor BS 335 or a non-anchor BS 345 shown in FIG. 3 may correspond to a BS 110 shown in FIG. 1. Similarly, a UE 355 shown in FIG. 3 may correspond to a UE 120 shown in FIG. 1.

As shown by reference number 365, in some aspects, a RAN that includes an IAB network may utilize a variety of spectrum types. For example, an IAB network may utilize a variety of differing radio frequency bands. In a few particular examples and according to certain aspects, millimeter wave (mmW) technology or directional communications can be utilized (for example, beamforming, precoding) for communications between BSs or UEs (for example, between two BSs, between two UEs, or between a BS and a UE). In additional or alternative aspects or examples, wireless backhaul links 370 between BSs may use millimeter waves to carry information or may be directed toward a target BS using beamforming, precoding. Similarly, the wireless access links 375 between a UE and a BS may use millimeter waves or may be directed toward a target wireless node (for example, a UE or a BS). In this way, inter-link interference may be reduced.

In some aspects, an IAB network may support a multi-hop network or a multi-hop wireless backhaul. Additionally, or alternatively, each node of an IAB network may use the same radio access technology (for example, 5G/NR). Additionally, or alternatively, nodes of an IAB network may share resources for access links and backhaul links, such as time resources, frequency resources, and spatial resources. Furthermore, various architectures of IAB-nodes or IAB-donors may be supported.

In some aspects, an IAB-donor may include a central unit (CU) that configures IAB-nodes that access a core network via the IAB-donor and may include a distributed unit (DU) that schedules and communicates with child nodes of the IAB-donor.

In some aspects, an IAB-node may include a mobile termination component (MT) that is scheduled by and communicates with a DU of a parent node, and may include a DU that schedules and communicates with child nodes of the IAB-node. A DU of an IAB-node may perform functions described in connection with BS 110 for that IAB-node, and an MT of an IAB-node may perform functions described in connection with UE 120 for that IAB-node.

Figure 4:
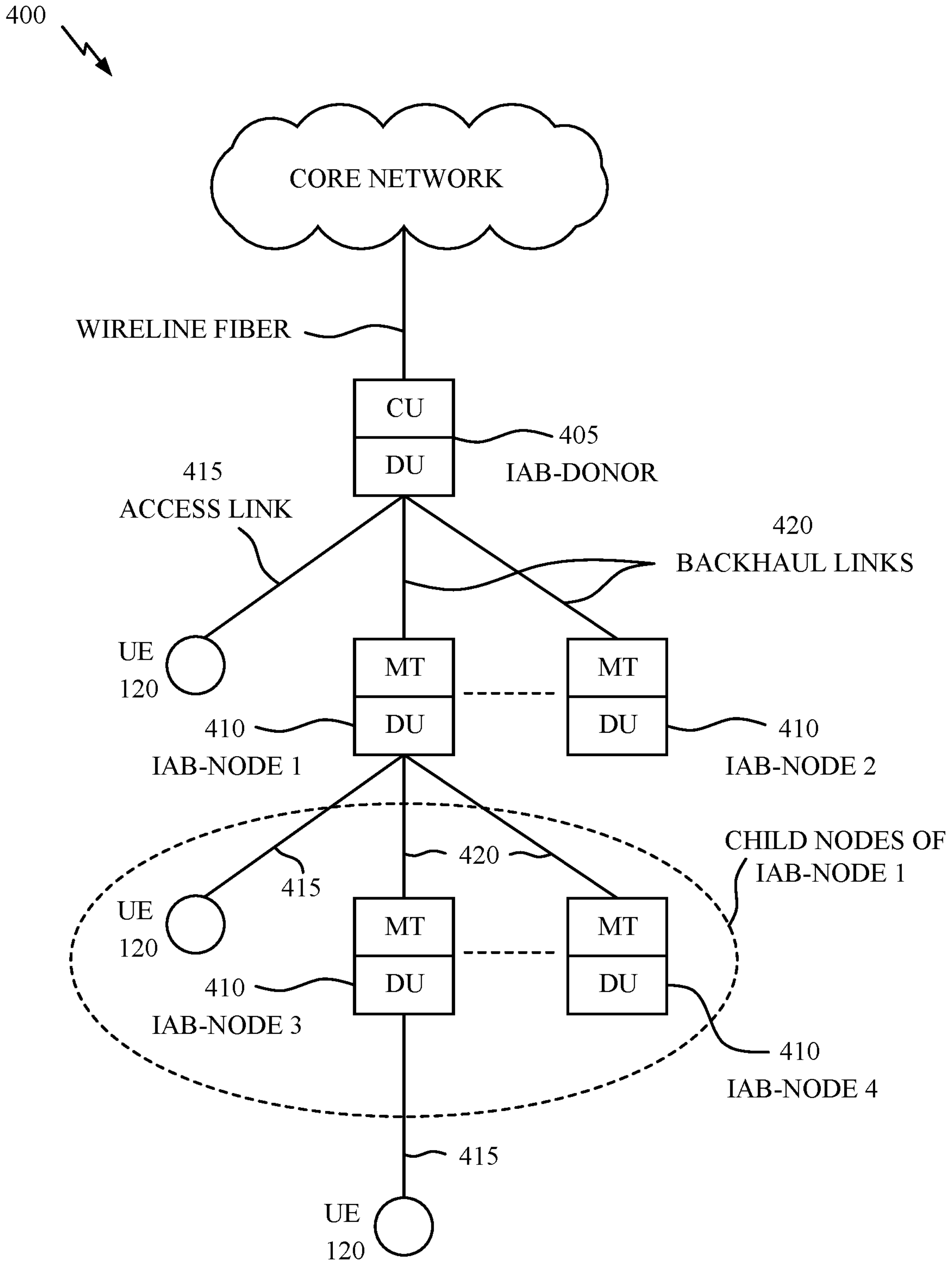
FIG. 4 is a diagram illustrating an example of an integrated access and backhaul (IAB) network architecture, in accordance with various aspects of the disclosure.

FIG. 4 is a diagram 400 illustrating an example of an IAB network architecture, in accordance with certain aspects of the present disclosure. As shown in FIG. 4, an IAB network may include an IAB-donor 405 that connects to a core network via a wired connection (for example, as a wireline fiber). For example, an Ng interface of an IAB-donor 405 may terminate at a core network. Additionally, or alternatively, IAB donor-405 may connect to one or more devices of the core network that provide a core access and mobility management function (AMF). In certain aspects, IAB donor-405 may include a BS 110, such as an anchor BS 335, as described above in connection with FIG. 3. As shown, IAB-donor 405 may include a CU, which may perform access note controller (ANC) functions or AMF functions. The CU may configure a DU of IAB-donor 405 or may configure one or more IAB nodes 410 (for example, an MT or a DU of IAB node 410) that connect to the core network via IAB donor 405. Thus, a CU of IAB donor 405 may control or configure the entire IAB network that connects to the core network via IAB-donor 405, such as by using control messages or configuration messages (for example, a radio resource control (RRC) configuration message, an F1 application protocol (F1AP) message).

As described above, the IAB network may include IAB-nodes 410 (shown as IAB-nodes 1 through 4) that connect to the core network via IAB-donor 405. As shown, IAB-node 410 may include an MT and may include a DU. The MT of an IAB-node 410 (for example, a child node) may be controlled or scheduled by another IAB-node 410 (for example, a parent node) or by an IAB-donor 405. The DU of an IAB-node 410 (for example, a parent node) may control or schedule other IAB-nodes 410 (for example, child nodes of the parent node) or UEs 120. Thus, a DU may be referred to as a scheduling node or a scheduling component, and an MT may be referred to as a scheduled node or a scheduled component. In certain aspects, IAB-donor 405 may include a DU and not an MT. That is, IAB-donor 405 may configure, control, or schedule communications of IAB-nodes 410 or UEs 120. A UE 120 may include only an MT, and not a DU. That is, communications of a UE 120 may be controlled or scheduled by IAB-donor 405 or an IAB-node 410 (for example, a parent node of UE 120).

According to certain aspects, certain nodes may be configured to participate in control/scheduling processes. For example in certain aspects, when a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB-donor 405 or an IAB-node 410, and a child node may be an IAB-node 410 or a UE 120. Communications of an MT of a child node may be controlled or scheduled by a parent node of the child node.

As further shown in FIG. 4, a link between UE 120 and IAB-donor 405, or between UE 120 and IAB-node 410, may be referred to as an access link 415. Each access link 415 may be a wireless access link that provides UE 120 with radio access to a core network via IAB-donor 405, and potentially via one or more IAB nodes 410.

As further shown in FIG. 4, a link between IAB-donor 405 and IAB-node 410, or between two IAB-nodes 410, may be referred to as a backhaul link 420. Each backhaul link 420 may be a wireless backhaul link that provides IAB-node 410 with radio access to a core network via IAB-donor 405, and potentially via one or more other intermediate IAB-nodes 410.

In certain aspects, a backhaul link 420 may be a primary backhaul link or a secondary backhaul link (for example, a backup backhaul link). In certain aspects, a secondary backhaul link may be used if a primary backhaul link fails, becomes congested, or becomes overloaded. In an IAB network, network resources for wireless communications (for example, time resources, frequency resources, spatial resources) may be shared between access links 415 and backhaul links 420.

As described above, in a typical IAB network, IAB-nodes (for example, non-anchor BSs) are stationary (that is, non-moving). Next generation (5G) wireless networks have stated objectives to provide ultra-high data rate and support wide scope of application scenarios. IAB systems have been studied in 3GPP as one possible solution to help support these objectives.

As noted above, in an IAB network, a wireless backhaul solution is adopted to connect cells (e.g., IAB-nodes) to the core network (which uses a wired backhaul). Some attractive characteristics of an IAB network are support for multi-hop wireless backhaul, sharing of the same technology (e.g., NR) and resources (e.g., frequency bands) for both access and backhaul links.

There are various possible architectures for IAB-nodes, including layer-2 (L2) and layer-3 (L3) solutions and a particular architecture deployed may depend on what layers of a protocol stack are implemented in the intermediate nodes (e.g., IAB-nodes), for example, L2 relays may implement physical (PHY)/medium access control (MAC)/radio link control (RLC) layers.

As described herein, an IAB donor may be an enhanced gNB node with functions to control an IAB-network. A CU may refer to the central entity that controls the entire IAB-network through configuration. The CU holds RRC/packet data convergence protocol (PDCP) layer functions. A DU may be a scheduling node that schedules child nodes of this IAB-donor. The DU holds RLC/MAC/PHY layer functions.

An IAB-node is an L2 relay node consisting of MT and DU functions, as described herein. MT is a scheduled node similar to a UE scheduled by its parent IAB-node or IAB-donor. A DU is a scheduling node that schedules child nodes of this IAB-node.

Example Admission Control Techniques in an Integrated Access and Backhaul (IAB) Network Certain aspects of the present disclosure are directed to techniques for admission control for an Integrated Access and Backhaul (IAB) network. For example, an IAB-node may determine whether to admit a child node being handed over from a source base station (BS) to a target BS (e.g., in some cases, a source IAB-donor central unit (CU) to a target IAB-donor CU). In some scenarios, the child node may be served by the same IAB-node prior to and after the handover occurs. In some aspects, a target BS may indicate to the IAB-node that the child node is being served by the IAB-node itself. Thus, the IAB-node may know that admission of the child node should not require any additional resources to be allocated for the child node. As a result, the IAB-node may admit the child node and provide an acknowledgement to the target BS accordingly.

Figure 5A:
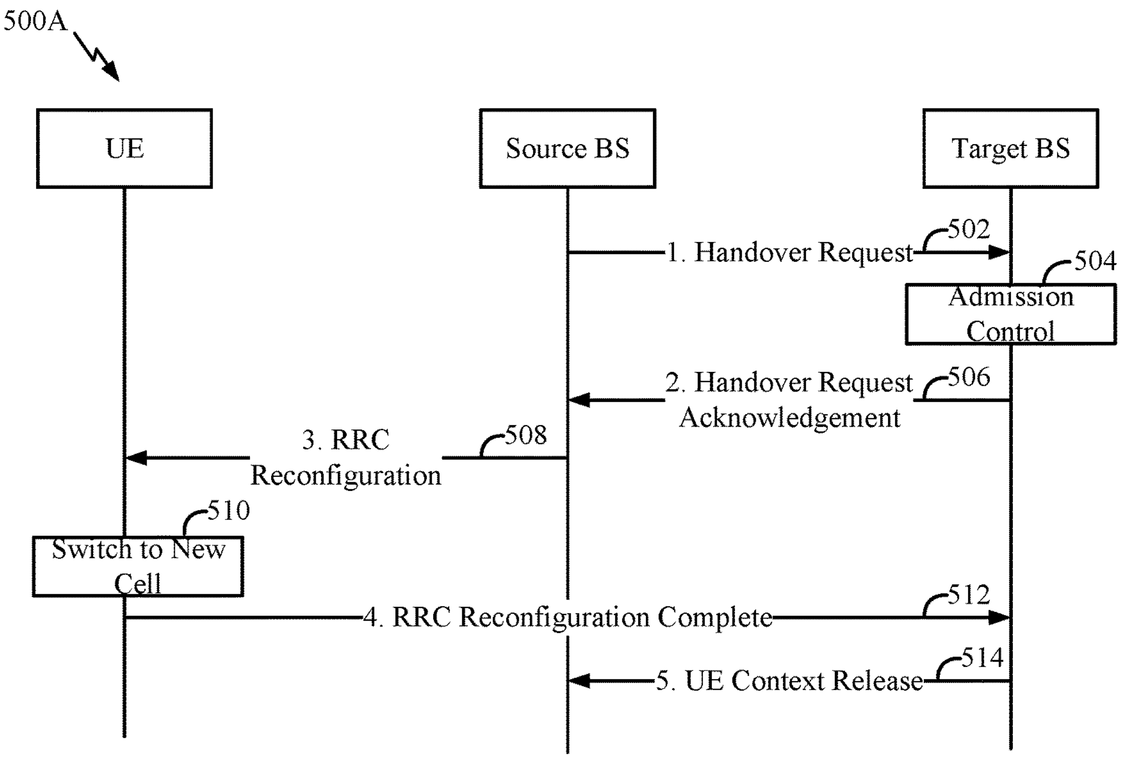
FIGS. 5A, 5B, and 5C illustrate example operations for handover of a UE from a source BS to a target BS, in accordance with certain aspects of the present disclosure.

FIG. 5A illustrates example operations 500A for handover of a UE from a source BS to a target BS, in accordance with certain aspects of the present disclosure. Although not shown, there may be some trigger for handover from the source BS to the target BS, such as a measurement report from the UE. As illustrated, the source BS may initiate handover by sending a handover request 502 (e.g., via an Xn interface) to the target BS.

The target BS may perform admission control operations at block 504. For admission control, the target BS may determine whether there are sufficient resources to admit the UE. If so, the target BS may then provide a radio resource control (RRC) configuration to the source BS as part of a handover request acknowledgement 506 (e.g. including a RRC reconfiguration message).

The source BS may then provide the RRC configuration 508 to the UE by forwarding the RRC reconfiguration message received in the handover request acknowledgement. The UE may then, at block 510, switch the RRC connection to the target BS and reply with an RRC reconfiguration complete message 512 to the target BS, as illustrated. The target BS may then send a UE context release message 514 to the source BS to inform the source BS about the success of the handover, allowing the source BS to release the resources reserved for the UE.

Certain aspects of the present disclosure are directed to techniques for performing the admission control operations at block 504 (e.g., operations to determine whether there are sufficient resources to serve the UE). In some aspects, each BS may include a CU and a distributed unit (DU), as described with respect to FIG. 4.

Figure 5B:
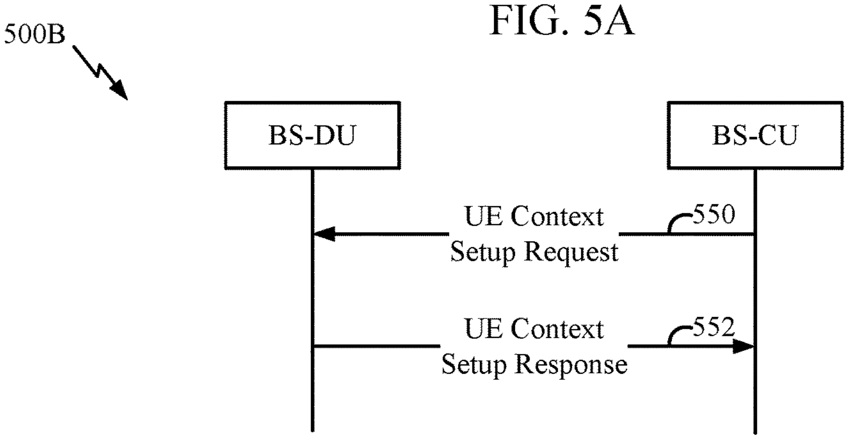
Figure 5C:
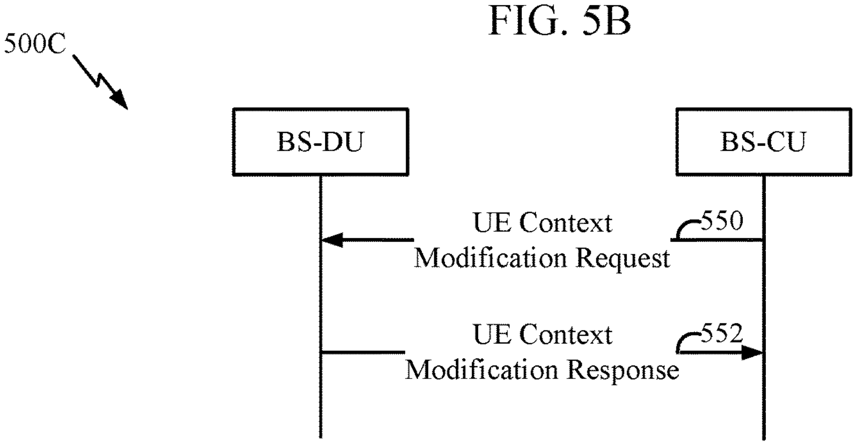

FIGS. 5B and 5C illustrate example operations 500B and 500C, respectively, for performing admission control operations at a target BS, in accordance with certain aspects of the present disclosure. The CU may receive the handover request from the source BS. The CU may then check with the DU to see if there are sufficient resources to serve the UE. To do so, either a context setup procedure may be used, as illustrated in FIG. 5B, or a context modification procedure may be used, as illustrated in FIG. 5C. The context setup procedure may be used for an initial UE context setup with the DU, and any subsequent modification to the context for the UE may be performed via the context modification procedure.

The context setup or modification request may be used to determine whether the DU is able to provide a particular service for the UE. In other words, the purpose of the UE context setup/modification procedure is to establish/modify the UE context including, among others a signalling radio bearer (SRB), a data radio bearer (DRB), a backhaul (BH) radio link control (RLC) channel, and/or a sidelink (SL) DRB configuration (e.g., for SL communication between UEs). In some aspects, a context for a child node may include a BH RLC channel if the child node is a child IAB-MT or an IAB-node. In some implementations, the UE context setup/modification procedure may use UE-associated signalling.

As illustrated in FIGS. 5B and 5C, the CU may send a UE context setup/modification request 550 to the DU. The DU may then report back to the CU indicating whether the DU is capable of providing services for the UE via a UE context setup/modification response 552. For example, the DU may report to the CU a list of DRBs/SRBs/SL DRBs successfully established/modified, a list of DRBs/SRBs/SL DRBs that failed to be established/modified, a list of BH RLC CHs successfully established/modified, and a list of BH RLC CHs that failed to be established/modified. In some scenarios, the DU may indicate that the UE context setup/modification has failed.

Figure 6:
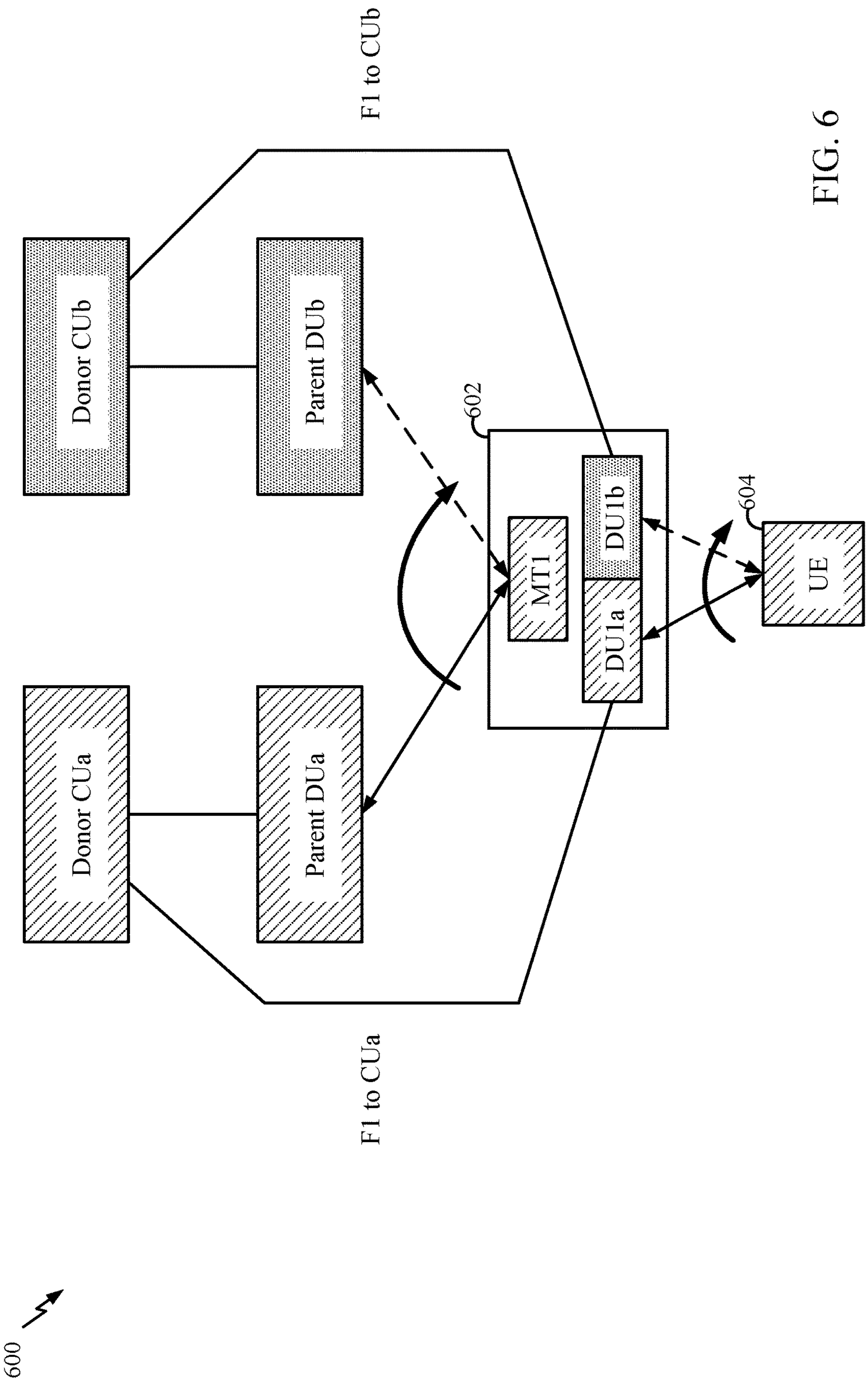
FIG. 6 illustrates example operations for migration between central units (CUs), in accordance with certain aspects of the present disclosure.

FIG. 6 illustrates example operations 600 for migration between CUs, in accordance with certain aspects of the present disclosure As illustrated in FIG. 6, an IAB-node 602 may be serving one or more child nodes, such as, the UE 604 (or another IAB-node in some implementations). While FIG. 6 illustrates a UE as the child node of IAB-node 602 to facilitate understanding, the child node of IAB-node 602 may be another IAB-node in some implementations.

As illustrated, the IAB-node 602 may include an IAB-MT (hereinafter referred to as "MT1") and an IAB-DU. In some implementations, the IAB-DU of IAB-node 602 may be implemented using multiple logical IAB-DUs, each associated with a different CU. For example, a first logical IAB-DU (hereinafter referred to as "DU1*a*") of IAB-node 602 may be associated with and mange communications for a first donor CU (hereinafter referred to as "CUa"), and a second logic IAB-DU (hereinafter referred to as "DU1*b*") may be associated with and manage communications for a second donor CU (hereinafter referred to as "Cub"). As used herein, a logical IAB-DU refers to a DU that has its own F1 connection (e.g., DU1*a* has an F1 connection with CUa while DU1*b* has an F1 connection with Cub). Logical IAB-DUs may be implemented on the same physical components (e.g., with different software components) or on different physical components.

As illustrated, MT1 may be connected to CUa through a parent DU (hereinafter referred to as "parent DUa") and connected to CUb through another parent DU (hereinafter referred to as "parent DUb"). While FIG. 6 shows parent DUa having a direct connection to CUa to facilitate understanding, there may be one or more other IAB-nodes in the link between parent DUa and CUa in some implementations. Similarly, there may be one or more other IAB-nodes in the link between parent DUb and CUb in some implementations. Moreover, while parent DUa and parent DUb are shown as two separate nodes, parent DUa and parent DUb may be two logical DUs of the same node in some implementations, each associated with one of the CUs (e.g., in a case where there are multiple descendant nodes).

As illustrated, MT1 of IAB-node 602 may migrate from CUa to CUb. In some cases, an IAB node (e.g., IAB-node 602) may have simultaneous F1 interfaces to two donor-CUs (e.g., CUa and CUb) using separate logical IAB-DUs (e.g., DU1*a* and DU1*b*) in the same physical node, as described. CUa may also be referred to as the source CU (e.g., the CU of a source BS), and CUb may also be referred to as the target CU (e.g., the CU of a target BS). F1 connections may use a source or target path depending on path availability. In one example, the IAB-node may have simultaneous connectivity with parent DUa and parent DUb (e.g. via new radio (NR)-dual connectivity (DC), multi-RAT (MR)-DC, dual access protocol stacks (DAPS), or multi-MT), and the UE may have to be migrated from DU1*a* to DU1*b*.

UE 604 may migrate from CUa to CUb (e.g., from a source BS to a target BS). Thus, UE 604 may switch from DU1*a* to DU1*b*. For instance, CUb may perform a UE context setup procedure with DU1*b* of the target BS. In other words, DU1*b* may perform admission control operations as described with respect to FIG. 5A. In order for DU1*b* to determine whether to admit UE 604 for the handover, DU1*b* may be made aware that the incoming UE (e.g., UE 604) is presently connected to DU1*a*, and as a result, consume no additional resources at IAB-node 602 since the same physical link will be used after handover. In other words, DU1*b* may be unaware of UE 604, and without any signalling to identify UE 604 as a UE that is being currently served by DU1*a*, DU1*b* might reject the admission of UE 604 (e.g., fail to setup at least part of the UE context). Thus, in some aspects of the present disclosure, CU1*b* may inform DU1*b* that UE 604 is currently served by DU1*a* and that admission of UE 604 consumes no additional resources at the IAB-node 602 since DU1*a* and DU1*b* use the same physical resources, and therefore, UE 604 should be admitted for service via DU1*b* with the new connection to CUb. Descendant IAB-MTs and UEs may have to migrate to donor-CUb in a similar manner. The same operations may apply for migration of a UE of a dual-connected IAB-node.

In a first example, DU1*a* and DU1*b* may serve different cells with different NR cell global identity (NCGI) or NR cell identity (NCI). A first cell of DU1*a* and a second cell of DU1*b* may have the same or different physical cell IDs (PCIs) and frequencies. In the latter case, IAB-node 602 may use different physical resources to serve a child on DU1*a* versus DU1*b*.

In a second example, DU1*a* and DU1*b* of IAB-node 602 may not be physically collocated. Serving UE 604 on DUb may consume different resources than serving UE 604 on DUa. Thus, the physical implementation/proximity of DUa and DUb is an additional factor for admission control at DU1*b*. This may have to be shared with CUb by the IAB-node, CUa, or the core network.

Figure 7:
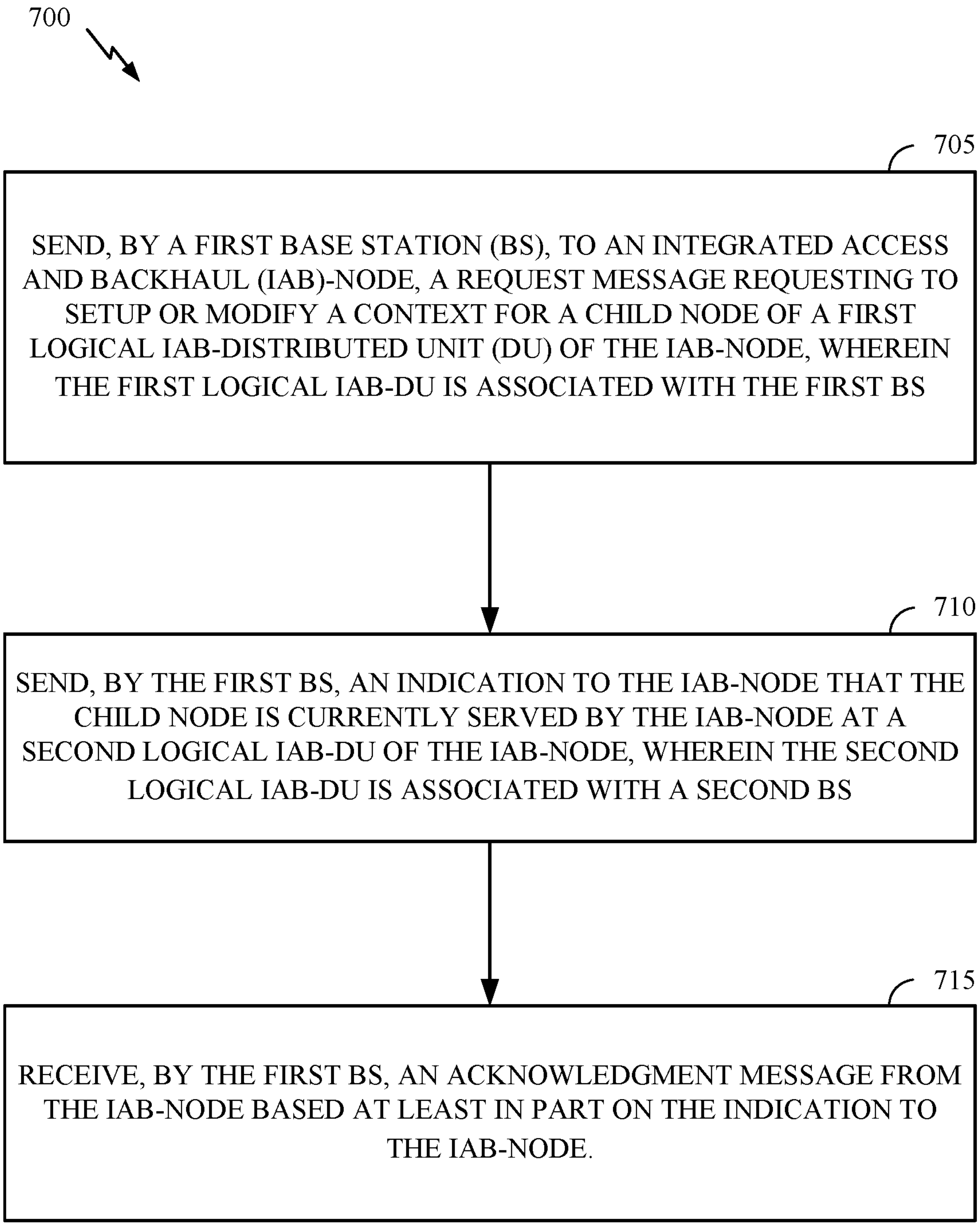
FIG. 7 is a flow diagram illustrating example operations for wireless communication by a BS, in accordance with certain aspects of the disclosure.

FIG. 7 is a flow diagram illustrating example operations 700 for wireless communication by a base station (BS), in accordance with certain aspects of the present disclosure. For example, operations 700 may be performed by a first BS, such as a first IAB-donor-CU (e.g., CUb described with respect to FIG. 6).

Operations 700 may be implemented as software components that are executed and run on one or more processors (e.g., controller/processor 240 of FIG. 2). Further, the transmission and reception of signals by the BS (e.g., IAB-donor-CU) in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 230, 220, 238, 240, and 244) obtaining and/or outputting signals.

Operations 700 begin, at 705, with first BS sending, to an IAB-node, a request message (e.g., a setup request message or context modification request message) requesting to setup or modify a context for a child node (e.g., UE 604 illustrated in FIG. 6 or another IAB-node) of a first logical IAB-DU (e.g., DU1*b* illustrated in FIG. 6) of the IAB-node. The first logical IAB-DU may be associated with the first BS (e.g., Cub illustrated in FIG. 6). For instance, the first logical IAB DU may be configured to manage a connection (e.g., F1 connection) established between the IAB-node and the first BS.

At 710, the first BS sends an indication to the IAB-node that the child node (e.g., UE 604 or another IAB-node) is currently served by the IAB-node at a second logical IAB-DU (e.g., DU1*a* illustrated in FIG. 6) of the IAB-node. The second logical IAB-DU may be associated with a second BS (e.g., CUa illustrated in FIG. 6). For instance, the second logic IAB-DU may be configured to manage a connection (e.g., F1 connection) established between the IAB-node and the second BS.

The request message may be for handover of the child node from the second BS (e.g., a source BS) to the first BS (e.g., target BS). In certain aspects, the request message may include the indication that the child node is currently served by the IAB-node, as described herein.

In some aspects, the indication to the IAB-node may include an indication identifying the child node. The identification of the child node may be performed in any suitable manner. For example, the indication identifying the child node may include an indication of a mapping between a radio bearer (RB) (e.g., an SRB or a DRB or an SL DRB), BH RLC CH or quality of service (QoS) flow configured at the second logical IAB-DU to another RB, another BH RLC CH, or another QoS flow, respectively, to be configured at the first logical IAB-DU for the child node. In other words, a request message may configure a RB, BH RLC CH or QoS flow at the first logical IAB-DU of the IAB-node. The indication sent by the first BS at 710 may include a mapping of the RB, BH RLC CH or QoS flow configured at the first logic IAB-DU to a corresponding RB, BH RLC CH or QoS flow configured at the second logical IAB-DU. The indication may also include QoS information of a corresponding RB, BH RLC CH or QoS flow at the second logical IAB-DU.

In certain aspects, the indication identifying the child node at 710 may include an identifier of the second BS associated with the second logical IAB-DU of the IAB-node. For example, the indication identifying the child node may include an identifier of a cell served by the second logical IAB-DU of the IAB-node. In some aspects, the identifier may uniquely identify the cell using, e.g., an NCGI or NC. In certain aspects, the identifier may include a PCI.

At 715, the first BS receives an acknowledgment message (e.g., a context setup response message or context modification response message) from the IAB-node based at least in part on the indication to the IAB-node.

Figure 8:
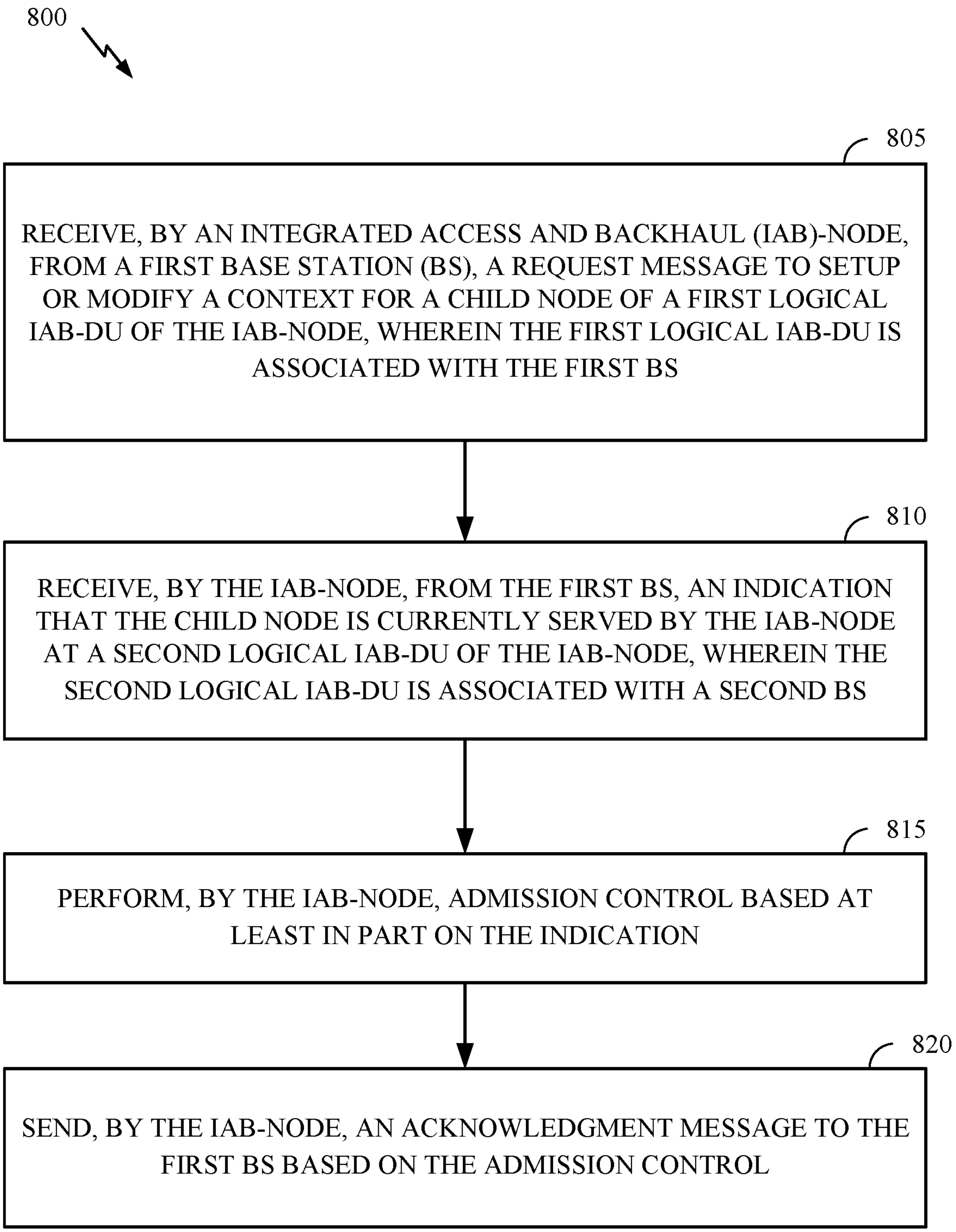
FIG. 8 is a flow diagram illustrating example operations for wireless communication by an IAB node, in accordance with various aspects of the disclosure.

FIG. 8 is a flow diagram illustrating example operations 800 for wireless communication by an IAB-node, in accordance with certain aspects of the present disclosure. For example, operations 800 may be performed by IAB-node 602 illustrated in FIG. 6.

Operations 800 may be implemented as software components that are executed and run on one or more processors (e.g., controller/processor 240 of FIG. 2). Further, the transmission and reception of signals by the IAB-node in operations 800 may be enabled, for example, by one or more antennas (e.g., antennas 234 of FIG. 2). In certain aspects, the transmission and/or reception of signals by the IAB-node may be implemented via a bus interface of one or more processors (e.g., controller/processor 230, 220, 238, 240, and 244) obtaining and/or outputting signals.

Operations 800 begin, at 805, with the IAB-node receiving, from a first BS (e.g., Cub illustrated in FIG. 6), a request message to setup or modify a context for a child node of a first logical IAB-DU of the IAB-node. The first logical IAB-DU may be associated with the first BS.

At 810, the IAB-node receives, from the first BS, an indication that the child node is currently served by the IAB-node at a second logical IAB-DU of the IAB-node. The second logical IAB-DU may be associated with a second BS.

At 815, the IAB-node may perform admission control (e.g., reserve resources) based at least in part on the indication, and at block 820, send an acknowledgment message to the first BS based on the admission control.

Figure 9:
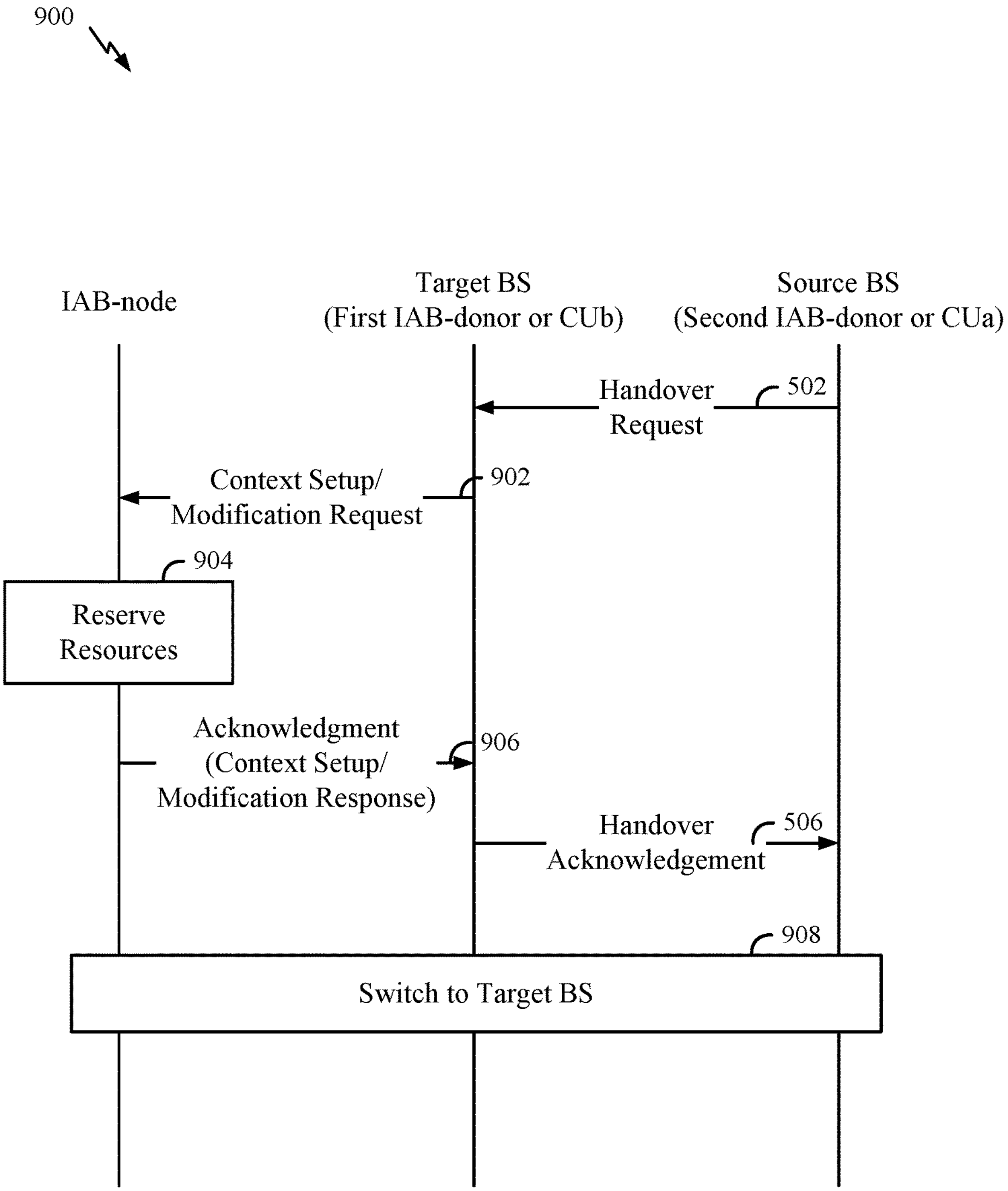
FIG. 9 is a call flow diagram illustrating example operations for handover, in accordance with certain aspects of the present disclosure.

FIG. 9 is a call flow diagram 900 illustrating example operations for handover, in accordance with certain aspects of the present disclosure. As illustrated, an IAB-donor-CU (e.g., CUa of a source BS, referred to as the second IAB-donor-CU in operations 700 of FIG. 7) may send a handover request 502 to another IAB-donor-CU (e.g., CUb of a target BS, referred to as the first IAB-donor-CU in operations 700 of FIG. 7). CUb (e.g., the first IAB-donor-CU) may send a request 902 (e.g., the UE context setup request or the UE context modification request, as described with respect to FIGS. 5B and 5C) to an IAB-node to setup or modify a context for a prospective child (e.g., child node such as UE 604 or other IAB-node) of a first logical IAB-DU (e.g., DU1*b* illustrated in FIG. 6) of the IAB-node associated with CUb (e.g., the first IAB-donor-CU). CUb may indicate (e.g., via request 902) to IAB-node that the prospective child is currently served by the IAB-node at a second logical IAB-DU (e.g., DU1*a* illustrated in FIG. 6) of the IAB-node. The indication may include an identifier of the prospective child at the second logical IAB-DU of the IAB-node. For example, the CUb may identify a UE (e.g., UE 604), a radio bearer, or BH RLC CH. That is, a request message may configure a radio bearer (SRB or DRB or SL DRB) or BH RLC CH or QoS flow at the first logical IAB-DU of the IAB-node. The indication may include a mapping to a corresponding RB, BH RLC CH, or QoS flow configured at the second logical IAB-DU, as described herein. In some cases, the indication may include QoS information of corresponding RB or BH RLC CH or QoS flow configured at the second logical IAB-DU.

A radio bearer may be identified by an F1-U tunnel that transports the bearer. The F1-U tunnel is further identified by a tunnel endpoint ID (TEID). The identification of the child node may also include UE IDs on F1 interface (e.g. gNB-CU UE F1 application protocol (AP) ID and gNB-DU UE F1 AP ID). These may be used by CUb to identify the UE initially served on DUa and migrated to DUb. CUa and CUb may share these IDs.

In some aspects, the indication may include an identifier of CUa (e.g., the second IAB-donor-CU) associated with the second logical IAB-DU (DU1*a*) of the IAB-node. For example, the indication may include an identifier of a source cell served by the second logical IAB-DU of the IAB-node. The cell identifier may be NCGI/NCI or PCI, as described herein. As illustrated, the IAB-node may then reserve resources for the child node at block 904, and send an acknowledgement 906 to CUb. CUb may then send a handover request acknowledgement 506 to CUa. At block 908, the switch from the source BS to the target BS may occur, as described with respect to FIG. 5A.

Referring back to FIG. 6, in some implementations, the handover of a UE from CUa to CUb may be triggered by a measurement report from the UE 604 to CUa. The measurement report may also be sent from CUa to DU1*b* indicating that UE 604 may be migrating from CUa to CUb. In other words, DU1*b* may be informed that UE 604 has measured the link towards IAB-node 602, DU1*a*, or DU1*b*, facilitating the setup of the connection by DU1*b* with UE 604.

In other words, CUa may include in the UE context setup/modification request message to DU1*b*, RRC information having the measurement report that triggered the handover of UE 604. This measurement report may include measurement of the serving cell in an information element (IE) (e.g., measResultServingMOList IE). The IE may contain the serving cell identifier, which may be a gNB-local ID, as well as a PCI which may not uniquely identify the serving cell. Thus, the measurement report may not indicate to IAB-node 602 that the UE is currently being served by IAB-node 602 itself. In certain implementations, the UE/descendant IAB-MT may switch logical IAB-DUs of an IAB-node without submitting a measurement report since this may be triggered by the migration of an upstream node (e.g., if the signal quality of the link between UE 604 and IAB-node 602 is not the cause for the handover). Therefore, certain aspects of the present disclosure provide additional signalling to IAB-node 602 that identifies that UE 604 is being admitted for handover as a UE being currently served by IAB-node 602. The aspects described herein also provide admission control techniques at a finer level, e.g. bearer or BH RLC CH.

Wireless Communications Devices

Figure 10:
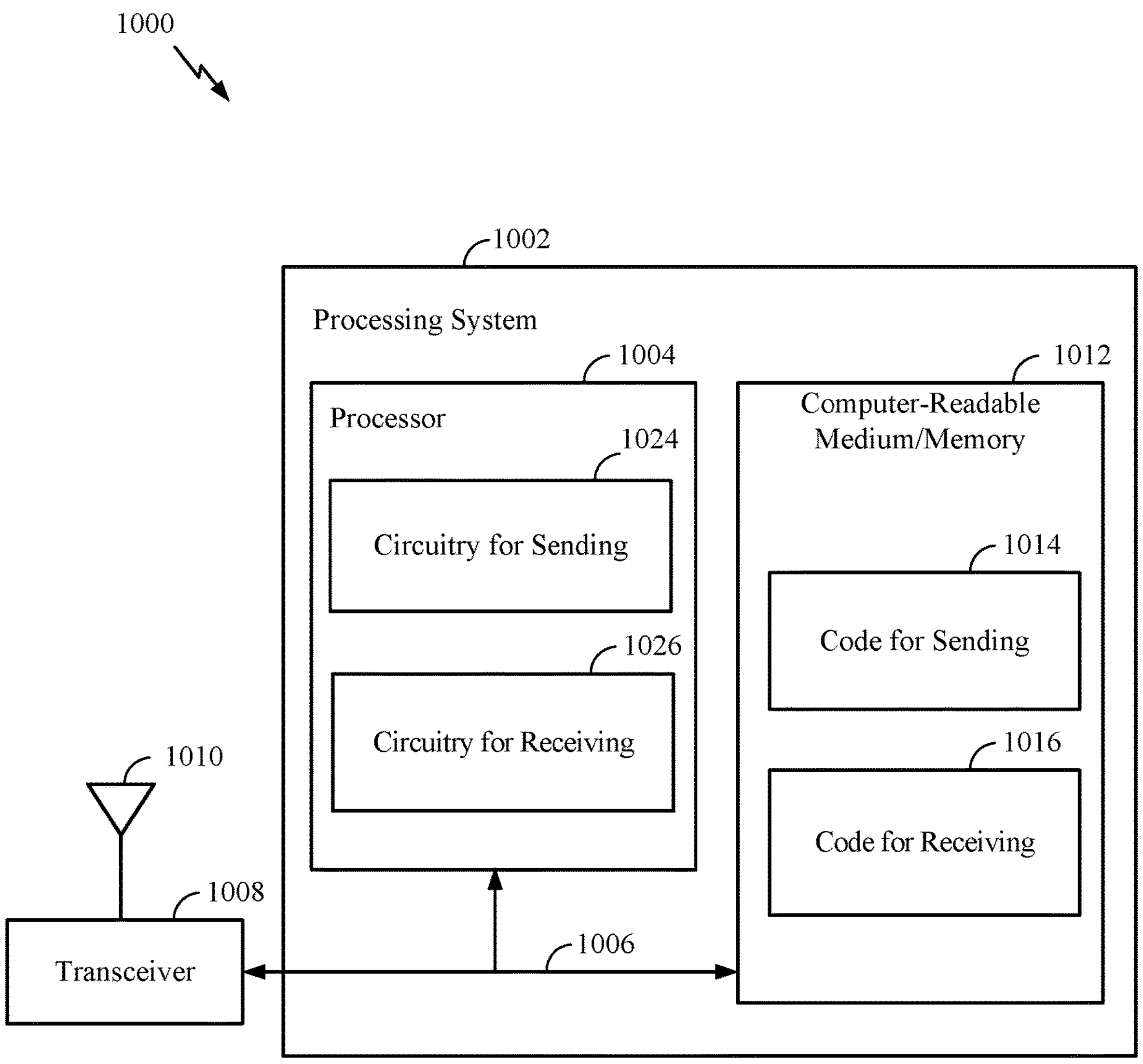
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) operable, configured, or adapted to perform operations for the techniques disclosed herein, such as the operations illustrated in FIG. 7. In some examples, communications device 1000 may be a station (BS), and more specifically, an Integrated Access and Backhaul (IAB)-donor-central unit (CU) (e.g., Donor CUb described with respect to FIG. 6).

Communications device 1000 includes a processing system 1002 coupled to a transceiver 1008 (e.g., a transmitter and/or a receiver). Transceiver 1008 is configured to transmit and receive signals for communications device 1000 via an antenna 1010, such as the various signals as described herein. Transceiver 1008 can, for example, include one or more components of BS 110 with reference to FIG. 2, including, for example, demodulators 232, transmit (TX) multiple-input multiple-output (MIMO) processor 230, transmit processor 220, MIMO detector 236, receive processor 238, and/or the like. Processing system 1002 may be configured to perform processing functions for communications device 1000, including processing signals received and/or to be transmitted by communications device 1000.

Processing system 1002 includes a processor 1004 coupled to a computer-readable medium/memory 1012 via a bus 1006. In certain aspects, computer-readable medium/memory 1012 is configured to store instructions (e.g., computer-executable code) that when executed by processor 1004, cause the processor 1004 to perform the operations illustrated in FIG. 7, or other operations for performing the various techniques discussed herein for admission control, for example, in an IAB network.

In certain aspects, computer-readable medium/memory 1012 stores code 1014 (e.g., an example means for) for sending and; code 1016 (e.g., an example means for) for receiving.

In certain aspects, code 1014 for sending may include code for sending, to an IAB-node, a request message requesting to setup or modify a context for a child node of a first logical IAB-distributed unit (DU) of the IAB-node, wherein the first logical IAB-DU is associated with the first BS. In certain aspects, code 1014 for sending may include code for sending an indication to the IAB-node that the child node is currently served by the IAB-node at a second logical IAB-DU of the IAB-node, wherein the second logical IAB-DU is associated with a second BS.

In certain aspects, code 1016 for receiving may include code for receiving an acknowledgment message from the IAB-node based at least in part on the indication to the IAB-node.

In certain aspects, processor 1004 has circuitry configured to implement the code stored in computer-readable medium/memory 1012. Processor 1004 includes circuitry 1024 (e.g., an example means for) for sending; and circuitry 1026 (e.g., an example means for) for receiving.

In certain aspects, circuitry 1024 for sending may include circuitry for sending, to an IAB-node, a request message requesting to setup or modify a context for a child node of a first logical IAB-DU of the IAB-node, wherein the first logical IAB-DU is associated with the first BS. In certain aspects, circuitry 1024 for sending may include circuitry for sending an indication to the IAB-node that the child node is currently served by the IAB-node at a second logical IAB-DU of the IAB-node, wherein the second logical IAB-DU is associated with a second BS.

In certain aspects, circuitry 1026 for receiving may include circuitry for receiving an acknowledgment message from the IAB-node based at least in part on the indication to the IAB-node.

Means for transmitting or sending (or means for outputting for transmission) may include a transmitter and/or an antenna(s) 234 of the BS 110 illustrated in FIG. 2 and/or circuitry 1024 and/or transceiver 1008 of communication device 1000 in FIG. 10. Means for receiving (or means for obtaining) may include a receiver and/or an antenna(s) 234 of the BS 110 illustrated in FIG. 2 and/or circuitry 1026 and/or transceiver 1008 of communication device 1000 in FIG. 10.

Notably, FIG. 10 is just one example, and many other examples and configurations of communications device 1000 are possible.

Figure 11:
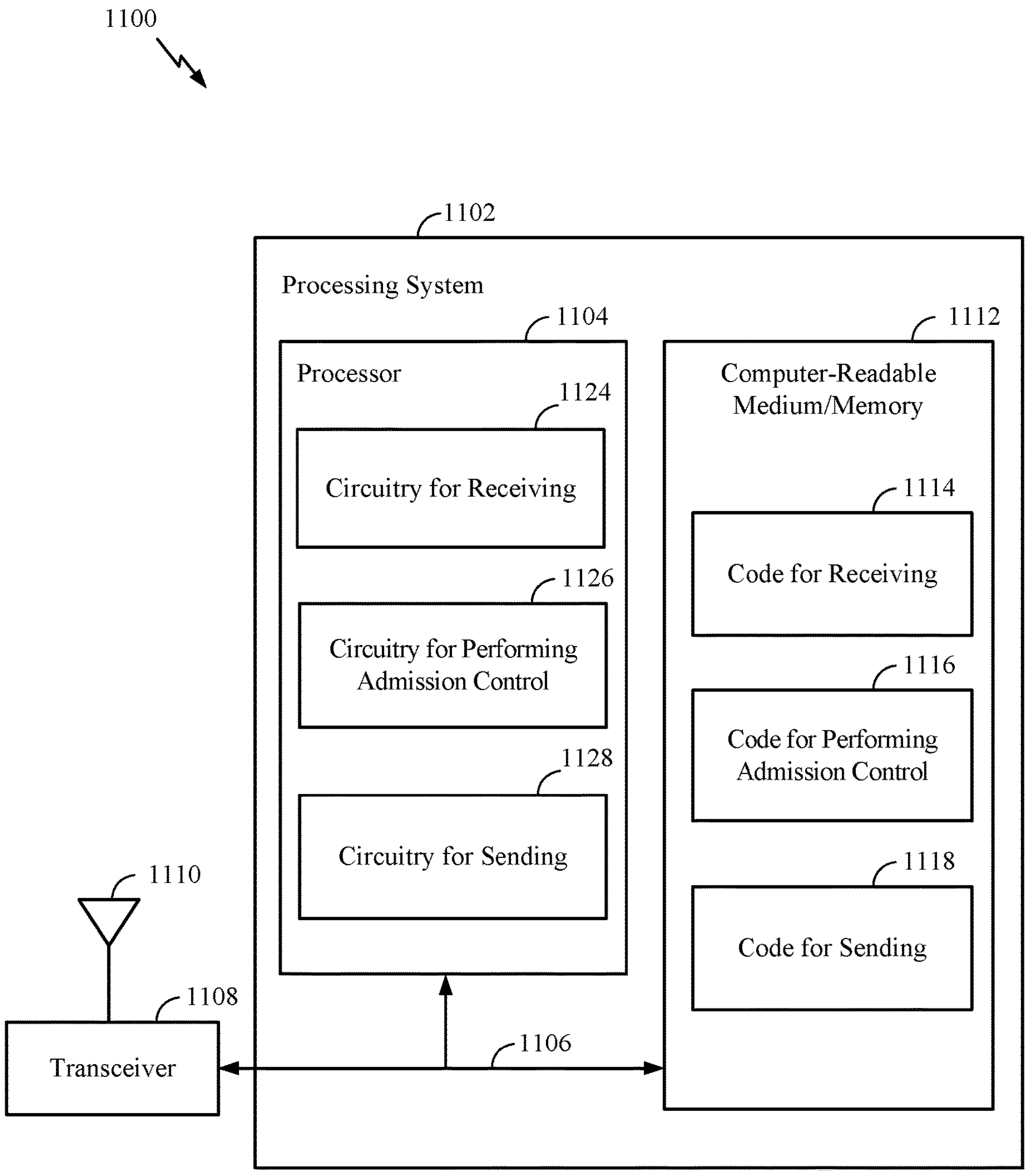
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) operable, configured, or adapted to perform operations for the techniques disclosed herein, such as the operations illustrated in FIG. 8. In some examples, communications device 1100 may be a network entity, and more specifically, an IAB-node (e.g., IAB-node 602 described with respect to FIG. 6).

Communications device 1100 includes a processing system 1102 coupled to a transceiver 1108 (e.g., a transmitter and/or a receiver). Transceiver 1108 is configured to transmit and receive signals for communications device 1100 via an antenna 1110, such as the various signals as described herein. Transceiver 1108 can, for example, include one or more components of BS 110 with reference to FIG. 2, including, for example, demodulators 232, TX MIMO processor 230, transmit processor 220, MIMO detector 236, receive processor 238, and/or the like. Processing system 1102 may be configured to perform processing functions for communications device 1100, including processing signals received and/or to be transmitted by communications device 1100.

Processing system 1102 includes a processor 1104 coupled to a computer-readable medium/memory 1112 via a bus 1106. In certain aspects, computer-readable medium/memory 1112 is configured to store instructions (e.g., computer-executable code) that when executed by processor 1104, cause processor 1104 to perform the operations illustrated in FIG. 8, or other operations for performing the various techniques discussed herein for admission control, for example, in an IAB network.

In certain aspects, computer-readable medium/memory 1112 stores code 1114 (e.g., an example means for) for receiving; code 1116 (e.g., an example means for) for performing admission control; and code 1118 (e.g., an example means for) for sending.

In certain aspects, code 1114 for receiving may include code for receiving, from a first BS, a request message to setup or modify a context for a child node of a first logical IAB-DU of the IAB-node, wherein the first logical IAB-DU is associated with the first BS. In certain aspects, code 1114 for receiving may include code for receiving, from the first BS, an indication that the child node is currently served by the IAB-node at a second logical IAB-DU of the IAB-node, wherein the second logical IAB-DU is associated with a second BS.

In certain aspects, code 1116 for performing admission control may include code for performing admission control based at least in part on the indication.

In certain aspects, code 1118 for sending may include code for sending an acknowledgment message to the first BS based the admission control.

In certain aspects, processor 1104 has circuitry configured to implement the code stored in computer-readable medium/memory 1112. Processor 1104 includes circuitry 1124 (e.g., an example means for) for receiving; circuitry 1126 (e.g., an example means for) for performing admission control; and circuitry 1128 (e.g., an example means for) for sending.

In certain aspects, circuitry 1124 for receiving may include circuitry for receiving, from a first BS, a request message to setup or modify a context for a child node of a first logical IAB-DU of the IAB-node, wherein the first logical IAB-DU is associated with the first BS. In certain aspects, circuitry 1124 for receiving may include circuitry for receiving, from the first BS, an indication that the child node is currently served by the IAB-node at a second logical IAB-DU of the IAB-node, wherein the second logical IAB-DU is associated with a second BS.

In certain aspects, circuitry 1126 for performing admission control may include circuitry for performing admission control based at least in part on the indication.

In certain aspects, circuitry 1128 for sending may include circuitry for sending an acknowledgment message to the first BS based the admission control.

Means for transmitting or sending (or means for outputting for transmission) may include a transmitter and/or an antenna(s) 234 of the BS 110 illustrated in FIG. 2 and/or circuitry 1128 and/or transceiver 1008 of communication device 1100 in FIG. 11. Means for receiving (or means for obtaining) may include a receiver and/or an antenna(s) 234 of the BS 110 illustrated in FIG. 2 and/or circuitry 1124 and/or transceiver 1108 of communication device 1100 in FIG. 11.

Means for performing admission control may include a processing system, which may include one or more processors, such as the transmit processor 220, the TX MIMO processor 230, the receive processor 238, and/or the controller/processor 240 of BS 110 illustrated in FIG. 2 and/or processing system 1102 of communication device 1100 in FIG. 11.

Notably, FIG. 11 is just one example, and many other examples and configurations of communications device 1100 are possible.

Example Aspects

Implementation examples are described in the following numbered aspects:

Aspect 1. A method for wireless communication by a first base station (BS), comprising: sending, to an Integrated Access and Backhaul (IAB)-node, a request message requesting to setup or modify a context for a child node of a first logical IAB-distributed unit (DU) of the IAB-node, wherein the first logical IAB-DU is associated with the first BS; sending an indication to the IAB-node that the child node is currently served by the IAB-node at a second logical IAB-DU of the IAB-node, wherein the second logical IAB-DU is associated with a second BS; and receiving an acknowledgment message from the IAB-node based at least in part on the indication to the IAB-node.

Aspect 2. The method of aspect 1, wherein the request message is for handover of the child node from the second BS to the first BS.

Aspect 3. The method of any one of aspects 1-2, wherein the request message comprises the indication that the child node is currently served by the IAB-node.

Aspect 4. The method of any one of aspects 1-3, wherein the first BS comprises a first Integrated Access and Backhaul (IAB) donor central unit (CU), and wherein the second BS comprises a second IAB donor CU.

Aspect 5. The method of any one of aspects 1-4, wherein the first logical IAB DU is configured to manage a connection established between the IAB-node and the first BS, and wherein the second logic IAB-DU is configured to manage a connection established between the IAB-node and the second BS.

Aspect 6. The method of any one of aspects 1-5, wherein the request message comprises a context setup request message or context modification request message.

Aspect 7. The method of any one of aspects 1-6, wherein the acknowledgment message is a context setup response message or context modification response message.

Aspect 8. The method of any one of aspects 1-7, wherein the child node comprises user equipment (UE) or another IAB-node.

Aspect 9. The method of any one of aspects 1-8, wherein the indication to the IAB-node comprises an indication identifying the child node.

Aspect 10. The method of aspect 9, wherein the indication identifying the child node comprises an indication of a mapping between a radio bearer (RB), backhaul (BH) radio link control (RLC) channel (CH) or quality of service (QoS) flow configured at the second logical IAB-DU to another RB, another BH RLC CH, or another QoS flow, respectively, to be configured at the first logical IAB-DU for the child node.

Aspect 11. The method of aspect 10, wherein the RB comprise a signaling RB (SRB) or a data RB (DRB) or a sidelink (SL) DRB.

Aspect 12. The method of any one of aspects 9-11, wherein the indication identifying the child node comprises QoS information of a RB, BH RLC CH, or QoS flow configured at the second logical IAB-DU for the child node.

Aspect 13. The method of any one of aspects 9-12, wherein the indication identifying the child node comprises an identifier of the second BS associated with the second logical IAB-DU of the IAB-node.

Aspect 14. The method of any one of aspects 9-13, wherein the indication identifying the child node comprises an identifier of a cell served by the second logical IAB-DU of the IAB-node.

Aspect 15. The method of aspect 14, wherein the identifier uniquely identifies the cell.

Aspect 16. The method of aspect 15, wherein the identifier comprises a new radio (NR) cell global identity (NCGI) or NR cell identity (NCI).

Aspect 17. The method of any one of aspects 14-16, wherein the identifier comprises physical cell identifier (PCI).

Aspect 18. A method for wireless communication by an Integrated Access and Backhaul (IAB) node, comprising: receiving, from a first base station (BS), a request message to setup or modify a context for a child node of a first logical IAB-DU of the IAB-node, wherein the first logical IAB-DU is associated with the first BS; receiving, from the first BS, an indication that the child node is currently served by the IAB-node at a second logical IAB-DU of the IAB-node, wherein the second logical IAB-DU is associated with a second BS; performing admission control based at least in part on the indication; and sending an acknowledgment message to the first BS based the admission control.

Aspect 19. The method of aspect 17, wherein the request message is for handover of the child node from the second BS to the first BS.

Aspect 20. The method of aspect 18, wherein the request message comprises the indication that the child node is currently served by the IAB-node.

Aspect 21. The method of any one of aspects 18-20, wherein performing the admission control comprises reserving resources for serving the child node.

Aspect 22. The method of any one of aspects 18-21, wherein the first BS comprises a first Integrated Access and Backhaul (IAB) donor central unit (CU), and wherein the second BS comprises a second IAB donor CU.

Aspect 23. The method of any one of aspects 18-22, wherein the first logical IAB-DU is configured to manage a connection established between the IAB-node and the first BS, and wherein the second logic IAB-DU is configured to manage a connection established between the IAB-node and the second BS.

Aspect 24. The method of any one of aspects 18-23, wherein the request message comprises a context setup request message or a context modification request message.

Aspect 25. The method of any one of aspects 18-24, wherein the acknowledgment message is a context setup response message or a context modification response message.

Aspect 26. The method of any one of aspects 18-25, wherein the child node comprises user equipment (UE) or a second IAB-node.

Aspect 27. The method of any one of aspects 18-26, wherein the indication to the IAB-node comprises an indication identifying the child node.

Aspect 28. The method of aspect 27, wherein the indication identifying the child node comprises an indication of a mapping between a radio bearer (RB), backhaul (BH) radio link control (RLC) channel (CH) or quality of service (QoS) flow configured at the second logical IAB-DU to another RB, another BH RLC CH, or another QoS flow, respectively, to be configured at the first logical IAB-DU for the child node.

Aspect 29. The method of aspect 28, wherein the radio bearer comprise a signaling RB (SRB) or a data RB (DRB) or a sidelink (SL) DRB.

Aspect 30. The method of any one of aspects 27-29, wherein the indication identifying the child node comprises QoS information of a radio bearer, BH RLC CH, or QoS flow configured at the second logical IAB-DU for the child node.

Aspect 31. The method of any one of aspects 27-30, wherein the indication identifying the child node comprises an identifier of the second BS associated with the second logical IAB-DU of the IAB-node.

Aspect 32. The method of any one of aspects 27-31, wherein the indication identifying the child node comprises an identifier of a cell served by the second logical IAB-DU of the IAB-node.

Aspect 33. The method of aspect 32, wherein the identifier uniquely identifies the cell.

Aspect 34. The method of aspect 33, wherein the identifier comprises a new radio (NR) cell global identity (NCGI) or NR cell identity (NCI).

Aspect 35. The method of any one of aspects 32-34, wherein the identifier comprises physical cell identifier (PCI).

Aspect 36. An apparatus comprising means for performing the method of any of aspects 1 through 35.

Aspect 37. An apparatus comprising at least one processor and a memory coupled to the at least one processor, the memory comprising code executable by the at least one processor to cause the apparatus to perform the method of any of aspects 1 through 35.

Aspect 38. A non-transitory computer-readable medium storing computer executable code thereon for wireless communications that, when executed by at least one processor, cause an apparatus to perform the method of any of aspects 1 through 35.

Additional Considerations

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 megahertz (MHz) or beyond), millimeter wave (mmW) targeting high carrier frequency (e.g., 25 gigahertz (GHz) or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic TTI or packet duration is the 1 ms subframe.

NR may utilize OFDM with a CP on the UL and DL and include support for half-duplex operation using time division duplexing (TDD). In NR, a subframe is still 1 millisecond (ms), but the basic TTI is referred to as a slot. A subframe contains a variable number of slots (e.g., 1, 2, 4, 8, 16, . . . slots) depending on the subcarrier spacing (SCS). The NR RB is 12 consecutive frequency subcarriers. NR may support a base SCS of 15 KHz and other SCS may be defined with respect to the base SCS, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system. For example, in some cases, processors such as those shown in FIG. 2 may be configured to perform operations 700 of FIG. 7, and/or operations 800 of FIG. 8.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7-8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or BS can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a first base station (BS), comprising:

sending, to an Integrated Access and Backhaul (IAB)-node, a request message requesting to setup or modify a context for a child node of a first logical IAB-distributed unit (DU) of the IAB-node, wherein the first logical IAB-DU is associated with the first BS;

sending an indication to the IAB-node that the child node is currently served by the IAB-node at a second logical IAB-DU of the IAB-node, wherein:

the second logical IAB-DU is associated with a second BS, and the indication comprises an identifier of the second BS associated with the second logical IAB-DU of the IAB-node; and receiving an acknowledgment message from the IAB-node based at least in part on the indication to the IAB-node.

2. The method of claim 1, wherein the first logical IAB-DU is configured to manage a connection established between the IAB-node and the first BS, and wherein the second logic IAB-DU is configured to manage a connection established between the IAB-node and the second BS.

3. The method of claim 1, wherein the request message comprises a context setup request message or context modification request message.

4. The method of claim 1, wherein the acknowledgment message is a context setup response message or a context modification response message.

5. The method of claim 1, wherein the child node comprises a user equipment (UE) or another IAB-node.

6. The method of claim 1, wherein the indication to the IAB-node comprises an indication identifying the child node.

7. The method of claim 6, wherein the indication identifying the child node comprises an indication of a mapping between a radio bearer (RB), backhaul (BH) radio link control (RLC) channel (CH) or quality of service (QoS) flow configured at the second logical IAB-DU to another RB, another BH RLC CI, or another QoS flow, respectively, to be configured at the first logical IAB-DU for the child node.

8. The method of claim 7, wherein the RB comprises a signaling RB (SRB) or a data RB (DRB) or a sidelink (SL) DRB.

9. The method of claim 6, wherein the indication identifying the child node comprises QoS information of an RB, BH RLC CH, or QoS flow configured at the second logical IAB-DU for the child node.

10. The method of claim 6, wherein the indication identifying the child node comprises an identifier of a cell served by the second logical IAB-DU of the IAB-node.

11. The method of claim 10, wherein the identifier uniquely identifies the cell.

12. The method of claim 11, wherein the identifier comprises a new radio (NR) cell global identity (NCGI) or NR cell identity (NCI).

13. The method of claim 10, wherein the identifier comprises a physical cell identifier (PCI).

14. A method for wireless communication by an Integrated Access and Backhaul (IAB)-node, comprising:

receiving, from a first base station (BS), a request message to setup or modify a context for a child node of a first logical IAB-DU of the IAB-node, wherein the first logical IAB-DU is-associated with the first BS, receiving, from the first BS, an indication that the child node is currently served by the IAB-node at a second logical IAB-DU of the IAB-node, wherein;

the second logical IAB-DU is associated with a second BS, and the indication comprises an identifier of the second BS associated with the second logical IAB-DU of the IAB-node;

performing admission control based at least in part on the indication; and sending an acknowledgment message to the first BS based on the admission control.

15. The method of claim 14, wherein performing the admission control comprises reserving resources for serving the child node.

16. The method of claim 14, wherein the first logical IAB-DU is configured to manage a connection established between the IAB-node and the first BS, and wherein the second logic IAB-DU is configured to manage a connection established between the IAB-node and the second BS.

17. The method of claim 14, wherein the request message comprises a context setup request message or a context modification request message.

18. The method of claim 14, wherein the acknowledgment message is a context setup response message or a context modification response message.

19. The method of claim 14, wherein the child node comprises a user equipment (UE) or a second IAB-node.

20. The method of claim 14, wherein the indication to the IAB-node comprises an indication identifying the child node.

21. The method of claim 20, wherein the indication identifying the child node comprises an indication of a mapping between a radio bearer (RB), backhaul (BH) radio link control (RLC) channel (CI) or quality of service (QoS) flow configured at the second logical IAB-DU to another RB, another BH RLC CH, or another QoS flow, respectively, to be configured at the first logical IAB-DU for the child node.

22. The method of claim 21, wherein the RB comprises a signaling RB (SRB) or a data RB (DRB) or a sidelink (SL) DRB.

23. The method of claim 20, wherein the indication identifying the child node comprises QoS information of a radio bearer, BH RLC CH, or QoS flow configured at the second logical IAB-DU for the child node.

24. The method of claim 20, wherein the indication identifying the child node comprises an identifier of a cell served by the second logical IAB-DU of the IAB-node.

25. The method of claim 24, wherein the identifier uniquely identifies the cell, and wherein the identifier comprises a new radio (NR) cell global identity (NCGI) or NR cell identity (NCI).

26. The method of claim 24, wherein the identifier comprises a physical cell identifier (PCI).

27. An apparatus for wireless communication, comprising:

at least one memory comprising instructions; and one or more processors configured to execute the instructions and cause the apparatus to:

send, to an Integrated Access and Backhaul (IAB)-node, a request message requesting to setup or modify a context for a child node of a first logical IAB-distributed unit (DU) of the IAB-node, wherein the first logical IAB-DU is associated with the apparatus, wherein the apparatus is a first base station (BS), send an indication to the IAB-node that the child node is currently served by the IAB-node at a second logical IAB-DU of the IAB-node, wherein:

the second logical IAB-DU is associated with a second BS, and the indication comprises an identifier of the second BS associated with the second logical IAB-DU of the IAB-node; and receive an acknowledgment message from the IAB-node based at least in part on the indication to the IAB-node.

28. An apparatus for wireless communication, comprising:

at least one memory comprising instructions; and one or more processors configured to execute the instructions and cause the apparatus to:

receive, from a first base station (BS), a request message to setup or modify a context for a child node of a first logical Integrated Access and Backhaul (IAB)-distributed unit (DU) of the apparatus, wherein the first logical IAB-DU is associated with the first BS;

receive, from the first BS, an indication that the child node is currently served by the IAB-node at a second logical IAB-DU of the apparatus, wherein:

the second logical IAB-DU is associated with a second BS, and the indication comprises an identifier of the second BS associated with the second logical IAB-DU of the IAB-node;

perform admission control based at least in part on the indication; and send an acknowledgment message to the first BS based on the admission control.

* * * * *